Sept. 1, 1959 E. D. OSTROFF ET AL 2,902,609

TRANSISTOR COUNTER

Filed March 26, 1956

INVENTOR
EDWARD D. OSTROFF
MAURICE A. MEYER

BY Joseph Weingarten
ATTORNEY

United States Patent Office 2,902,609
Patented Sept. 1, 1959

2,902,609

TRANSISTOR COUNTER

Edward D. Ostroff, South Lincoln, and Maurice A. Meyer, Natick, Mass., assignors to Laboratory for Electronics, Inc., Boston, Mass., a corporation of Delaware Application March 26, 1956, Serial No. 574,045

5 Claims. (Cl. 307—88.5)

Figure 1:
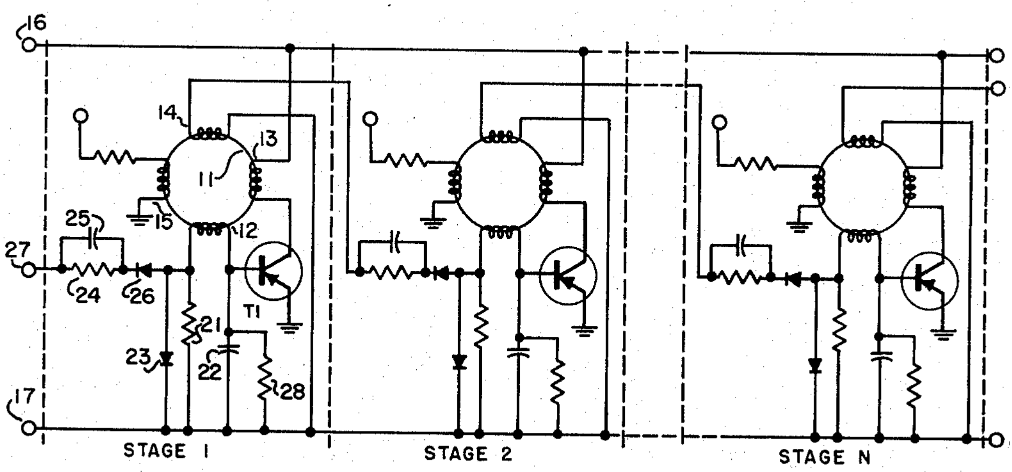

The present invention relates in general to bistable circuits and in particular to a novel bistable circuit which employs a magnetic core in cooperation with a single transistor to provide a compact, highly reliable, efficient and relatively inexpensive bistable circuit substantially independent of wide variations in transistor characteristics and suitable for cascading to form a counter, each stage thereof capable of providing one output pulse for a selected number of input pulses.

In a co-pending application by Meyer, Ostroff and Rubinstein, entitled Counting Apparatus, Serial No. 568,951, filed February 29, 1956 (now abandoned) there is described a novel magnetic core-condenser counter which employs a magnetic core and interstage transformer for each bistable stage. While the circuit there disclosed offers advantages not found in the prior art, it dissipates power in the standby state when not responding to input pulses. Although this circuit may be satisfactorily cascaded to form a counter having a large plurality of stages, some pulse deterioration occurs from stage to stage, thereby placing a practical limit on the number of stages which may be cascaded for a given input pulse duration and repetition rate.

Accordingly, it is a primary object of the present invention to provide a reliable, compact bistable circuit of low initial cost which dissipates negligible power in the standby state and employs relatively few components.

Another object of the invention is to provide a bistable circuit which utilizes a magnetic core and a single transistor.

Still a further object of the invention is to provide a bistable circuit wherein a magnetic core co-acts with a transistor to provide reliable operation substantially independent of the transistor characteristics.

Another object of the invention is to provide a bistable circuit adaptable for use as a counter which generates an output pulse in response to a predetermined number of input pulses.

Another object of the invention is to provide a pulse generating circuit wherein the integral with respect to time of each output pulse is a constant substantially independent of the transistor characteristic variation and not appreciably affected by changes in supply voltage.

Broadly speaking the invention comprises a magnetic core having first and second stable states, in association with a single switching transistor which, when activated, serves to effect the restoration of the core to its second stable state; however, the switching transistor may be activated only when the core is in the first stable state. Alternate input pulses to the novel circuit are effective in changing the core from the second stable state to the first stable state. The remaining pulses activate the switching transistor, thereby returning the core to its second stable state, the transistor dissipating power only when activated.

In a more specific form of the invention, a reset winding upon the core is adapted to be energized from a source of direct potential through the transistor. A control electrode of the transistor is arranged to be energized by an input pulse through a set winding on the core; however, with the core in the second stable state, an input pulse is effective only in switching the core to the first stable state. Consequently, the set winding presents a relatively high impedance to the input pulse, thereby preventing the latter pulse from being applied to said control electrode to render the transistor conductive. After switching, the next input pulse to the set winding causes no change in the core state; consequently, the winding then presents a low impedance and substantially all of the input pulse is applied to the control electrode of the transistor, activating conduction in the latter to effect energization of the reset winding and the return of the core to the second stable state. Regenerative feedback to the control electrode through the set winding maintains the transistor conductive until switching to the second stable state is complete.

In another embodiment, adjacent bistable stages employ respectively NPN and PNP transistors, thereby eliminating a winding from each core.

Figure 2:
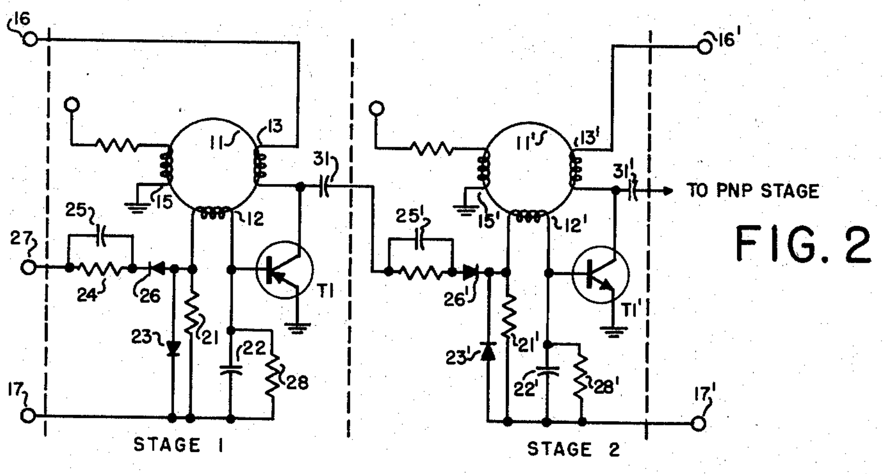

Other features, objects and advantages will become apparent from the following specification when read in connection with the accompanying drawing in which:

Fig. 1 illustrates a schematic circuit diagram of a circuit arrangement wherein all NPN transistors are employed; and Fig. 2 is a schematic circuit diagram of an embodiment wherein PNP transistors are employed in alternate stages.

With reference now to the drawing and more particularly Fig. 1 thereof, one embodiment of the novel circuit is shown. Each stage is seen to comprise a magnetic core 11 having wound thereon set, reset, interstage coupling, and output windings respectively 12, 13, 14 and 15. Negative terminal 16 is coupled to the collector electrode of transistor T1 through reset winding 13. The positive potential on terminal 17 is coupled to the base electrode of transistor T1 through resistor 21 and set winding 12, the parallel combination of capacitor 22 and resistor 28 being connected to the latter winding. The normally non-conductive diode 23 is connected across resistor 21. Input pulses are applied to winding 12 through the parallel combination of resistor 24 and capacitor 25 serially connected to diode 26. While the circuit of Fig. 1 is illustrated with PNP transistors, NPN transistors may be employed therein with a corresponding reversal of supply potential polarities on terminals 16 and 17 and the unilateral conductivity of diodes 23 and 26.

Having described the physical arrangement of the circuit, the mode of operation will now be explained. For the circuit arrangement shown wherein PNP transistors are employed as a switching element, negative input pulses are applied to set winding 12, it being understood that when NPN transistors are substituted in the manner discussed above, the input pulses are positive. In describing circuit operation, it is convenient to consider core 11 residing in the second stable state. An input pulse at terminal 27 is applied to set winding 12 through the parallel combination of resistor 24 and capacitor 25 serially connected with diode 26, the latter diode serving to prevent the application of positive input pulses to winding 12. The first input pulse switches core 11 to the first stable state. During the switching, winding 12 presents a relatively high impedance to the input pulse; therefore, a negligible portion of the latter pulse is applied to the base electrode of transistor T1. Thus, transistor T1, biased beyond cutoff as a result of the potential of terminal 17 being applied to the base electrode through resistor 21 and winding 12, remains non-conductive. However, the next negative input pulse energizes a set winding 12 which then presents a relatively low impedance because the core resides in the first stable state and is not switched. Consequently, substantially all of the input pulse is applied to capacitor 22 which is charged to a potential sufficiently negative to enable transistor T1 to conduct. This transition from the non-conducting to the conducting state is relatively rapid because of the regenerative action derived from the coupling between windings 12 and 13. When transistor T1 conducts, the collector current thereof flows through reset winding 13, thereby resetting the core to the second stable state. The switching of the core induces a pulse across winding 12 ending to drive the base more negative, whereby the collector current of T1 rapidly attains the saturation value and remains conductive until the core is driven into saturation. When the core has reached saturation in the region near the residual flux density corresponding to the second stable state, there is no transformer induced voltage across set winding 12 and capacitor 22 discharges through resistors 21 and 28 until the base again becomes positive, cutting off transistor T1. The presence of the latter resistor speeds the capacitor discharge whereby the pulse input rate may be correspondingly increased, it being understood the circuit is operative when resistor 28 is omitted. Diode 23 prevents the application to the preceding stage output winding of pulses derived across winding 12 in response to the resetting of core 11. The foregoing sequence of events is repeated for each pair of input pulses. Core stage 2 operates in the same manner, providing one output pulse for every four input pulses at terminal 27 since it is energized by the output pulses from core stage 1. In general, the *n*th stage will provide one output pulse for $2^n$ input pulses at terminal 27.

To effect stable operation of the circuit, it is desirable that the energy content of each input pulse be just beyond that sufficient to switch the core from the first stable state to the second stable state, each stable state corresponding to residual flux densities near opposite saturation regions. Thus, winding 12 presents a relatively high impedance for the entire duration of the input pulse, resulting in negligible charge being deposited upon capacitor 22. Excess pulse energy finds core 11 in the saturation region whence the impedance of winding 12 is relatively low; therefore, such energy charges capacitor 22, resulting in premature conduction in transistor T1, resetting of core 11 and destruction of the binary mode. The present circuit generates constant area pulses, independent of transistor characteristics in the following manner.

It is well known that the induced voltage across a winding $$e=-n\frac{d\phi}{dt}$$

where $n$ is the number of turns on the windings and $$\frac{d\phi}{dt}$$

is the rate of change of flux therethrough. Accordingly, $$\int edt=-n\int d\phi$$

or in a given time interval $$\frac{1}{n}\int edt=\phi_1-\phi_2$$

the change in flux during the specified interval. The left hand side of the latter equation is the voltage pulse area with respect to time derived across an output winding, and the right hand side depends only upon the initial and final flux states in the magnetic core respectively before and after the core is switched. Since the flux changes from one residual flux density to another in saturation regions of opposite polarity, the effect of the novel circuit is to generate constant area pulses dependent only upon the residual flux densities of the respective magnetic cores and independent of the transistor characteristics. By a proper selection of the number of turns on a winding, the core size and materials, the magnitude of the pulse area may be selected to be any desired value. Normally, this pulse area is selected to be just sufficient to switch the following core when operation in the binary mode is desired. By selecting the ratio of winding 14 turns to winding 12 turns to be such that the pulse area derived across winding 14 is a sub-multiple of the area of a pulse necessary to switch the following core, the circuit may be utilized not only in the binary mode but also in other modes whereby it responds with an output pulse to a selected number of input pulses.

With reference now to Fig. 2, there is illustrated a novel circuit arrangement of the invention wherein adjacent core stages utilize transistors having complementary characteristics, together with appropriate circuit modifications, to eliminate winding 14 of Fig. 1. The reference numerals of Fig. 1 designate corresponding parts in Fig. 2 and analogous circuit elements of core stage 1 in Figs. 1 and 2 are designated by primed reference numerals in core stage 2 of Fig. 2. The added advantage of having one less winding per core is achieved by employing in core stage 2, NPN transistor T1′, arranging diodes 26′ and 23′ to be unilaterally conducting in a reverse direction to that of the analogous diodes 26 and 23, and connecting collector and base electrodes of transistor T1′ to positive and negative potential sources respectively. With such an arrangement, core stage 2 may be energized from winding 13 as shown, with capacitor 31 coupling the positive pulse derived thereacross to winding 12 in core stage 2. The mode of operation of core stage 2 is substantially the same as that described above, with the exception that it is activated by positive rather than negative input pulses.

A counter of the type described herein has been reliably operated in the binary mode in response to input pulses at a 30 kc. rate, employing in each stage the following constructional details and circuit parameters:

Core 11—50 wraps ⅛ mil 479 Permalloy on ¼″ diameter x ⅛″ core
Winding 12—280 turns #38 wire
Winding 13—210 turns #38 wire
Winding 14—280 turns #38 wire
Winding 15—100 turns #38 wire
Terminal 16 potential −16.5 volts
Terminal 17 potential +6 volts
Resistor 21—10,000 ohms
Capacitor 22—2200 micromicrofarads
Diodes 23 and 26—Transitron 1N70
Resistor 24—1,000 ohms
Capacitor 25—1,000 micromicrofarads
Resistor 28—10,000 ohms
Transistor T1—General Electric 2N43A Numerous modifications of and departures from the specific embodiments described herein may be practiced by those skilled in the art without departing from the inventive concepts disclosed herein. Consequently, the invention is to be construed as limited only by the scope and spirit of the appended claims.

What is claimed is:

1. A bistable circuit comprising, a magnetic core having set, reset, and output windings thereon, a semi-conductor device having at least emitter, base, and collector electrodes, a first terminal connected to a first source of direct potential, a capacitor connected between said first terminal and said base electrode, a base resistor and said set winding serially connected between said first terminal and said base electrode, a unilaterally conducting device across said base resistor, an input terminal, an input resistor serially connected to a unilaterally conducting device between said input terminal and the junction of said base resistor and said set winding, a capacitor across said input resistor, a second source of direct potential of opposite polarity to said first source, said reset winding being connected between said second source and said collector electrode, said emitter being fixed of a potential intermediate said first and second sources.

2. A circuit for generating pulses of substantially constant energy comprising, a magnetic core having at least set, reset, and output windings thereon, a transistor having at least emitter, base, and collector electrodes, said set winding being serially connected with a first resistor between a common terminal and said base electrode, a base resistor between said common terminal and the junction of said reset winding and said input resistor, a unilaterally conducting device across said first resistor, sources of relatively high and relatively low direct potential, said reset winding being connected between said source of relatively high potential and said collector electrode, said source of relatively low direct potential being coupled to said base electrode, said emitter being fixed at a potential intermediate said first and second sources.

3. A counting circuit with each stage comprising, a magnetic core which may assume first and second stable states and having set and reset windings thereon, a transistor having emitter, base, and collector electrodes, first and second potential sources of opposite polarity, means for coupling said source of first potential to said base electrode to maintain said transistor normally non-conductive, means for coupling said second source of potential to said collector electrode through said reset winding whereby the collector current of said transistor when conducting flows through the latter winding, means for fixing the potential of said emitter at a value intermediate said first and second sources, means for coupling input pulses of a selected polarity to said base electrode through said set winding whereby input pulses are effective in rendering the transistor conductive only when said core is in the first stable state, and means for utilizing pulses derived across said reset winding of a selected polarity as the input pulse to the next stage.

4. Apparatus as in claim 3 wherein the selected input pulses of adjacent stages are of opposite polarity, one stage employing an NPN transistor, and the other a PNP transistor.

5. In a counter circuit a stage pair, each stage of said pair comprising a magnetic core which may assume first and second stable states and having at least set and reset windings thereon, a transistor having at least base, emitter and collector electrodes, first and second sources of direct potential of opposite polarity, means for coupling said first source of potential through said set winding to said base electrode where the transistor is rendered normally nonconductive, means for coupling said second source of potential of opposite polarity, means for coupling said first winding whereby the collector current of said transistor may flow through the latter winding, means for fixing the potential of said emitter at a value intermediate said first and second sources means for coupling input pulses of a selected polarity to said base electrode whereby said transistor is rendered conductive only when said core is in the first stable state, and means for coupling the pulses of a selected polarity derived across said reset winding of one stage in a pair to the other stage therein whereby the latter stage utilizes the coupled pulses as input pulses which are opposite in polarity to the input pulses selected for the former stage, one transistor in a stage being NPN and the other being NPN.

References Cited in the file of this patent

UNITED STATES PATENTS

| | | |
|---|---|---|
| 2,591,406 | Carter et al. | Apr. 1, 1952 |
| 2,620,448 | Wallace | Dec. 2, 1952 |
| 2,695,993 | Haynes | Nov. 30, 1954 |
| 2,744,198 | Raisbeck | May 1, 1956 |
| 2,760,088 | Pittman et al. | Aug. 21, 1956 |
| 2,772,357 | Wang | Nov. 27, 1956 |
| 2,824,698 | Van Nice et al. | Feb. 25, 1958 |

UNITED STATES PATENT OFFICE

CERTIFICATE OF CORRECTION

Patent No. 2,902,609 September 1, 1959

Edward D. Ostroff et al.

It is hereby certified that error appears in the printed specification of the above numbered patent requiring correction and that the said Letters Patent should read as corrected below.

Column 6, line 8, for "where" read -- whereby --; line 10, for "of opposite polarity, means for coupling said first" read -- to said collector electrode through said reset; line 22, for "NPN" read -- PNP --.

Signed and sealed this 25th day of April 1961.

(SEAL)
Attest:

ERNEST W. SWIDER
Attesting Officer

DAVID L. LADD
Commissioner of Patents